United States Patent
Grønn

(10) Patent No.: US 10,570,349 B2
(45) Date of Patent: Feb. 25, 2020

(54) METHOD FOR THE PRODUCTION OF PELLETS OR BRIQUETTES

(75) Inventor: Arne Johannes Grønn, Verdal (NO)

(73) Assignee: Zilkha Biomass Technologies LLC, Houston, TX (US)

( * ) Notice: Subject to any disclaimer, the term of this patent is extended or adjusted under 35 U.S.C. 154(b) by 646 days.

(21) Appl. No.: 13/159,233

(22) Filed: Jun. 13, 2011

(65) Prior Publication Data
US 2011/0302832 A1 Dec. 15, 2011

(30) Foreign Application Priority Data

| Dec. 15, 2008 | (NO) | ......................................... 327839 |
| Dec. 15, 2008 | (NO) | .................................. 20085249 |
| Jun. 2, 2009 | (NO) | .................................. 20092136 |
| Oct. 5, 2009 | (WO) | ............................. 2009/000346 |

(51) Int. Cl.
*C10L 5/44* (2006.01)

(52) U.S. Cl.
CPC .................................... *C10L 5/44* (2013.01)

(58) Field of Classification Search
CPC ............ Y02E 50/10; Y02E 50/30; C10L 5/44
USPC .......................................................... 44/605
See application file for complete search history.

(56) References Cited

U.S. PATENT DOCUMENTS

| 351,067 A | 10/1886 | Pond |
| 1,578,609 A | 3/1926 | Mason |
| 1,586,159 A | 5/1926 | Mason |
| 1,824,221 A | 9/1931 | Mason |
| 1,922,313 A | 8/1933 | Mason |
| 3,533,906 A | 10/1970 | Reiniger |
| 3,791,994 A | 2/1974 | Wenzel et al. |
| 3,961,913 A | 6/1976 | Brenneman et al. |
| 4,077,868 A | 3/1978 | Chambers |

(Continued)

FOREIGN PATENT DOCUMENTS

| CA | 1141376 A1 | 2/1983 |
| CA | 1267407 | 4/1990 |

(Continued)

OTHER PUBLICATIONS

Cullis; "The effect of steam explosion pretreatment parameters on softwood delignification efficiency"; thesis—University of British Columbia [online]; Feb. 11, 2003.

(Continued)

*Primary Examiner* — Ellen M McAvoy
*Assistant Examiner* — Ming Cheung Po
(74) *Attorney, Agent, or Firm* — Hall Estill Law Firm

(57) ABSTRACT

A method is provided for the production of pellets or briquettes from lignin containing material in the form of processable particles wherein the method includes the steps of: passing the material having a relative moisture content of more than about 20%, by weight, to a drying step and drying it to a relative moisture content of about 0-30% by weight; passing the material to a heat treatment step and heating the material to about 180-235° C. by injecting steam into a reactor; maintaining the material in the reactor at the temperature reached for a sufficient time to soften the material and release lignin; reducing the pressure in the reactor in at least one step; and pelletizing or briquetting the treated material. The invention also concerns pellets or briquettes produced by the method.

28 Claims, 1 Drawing Sheet

(56) References Cited

U.S. PATENT DOCUMENTS

| | | | |
|---|---|---|---|
| 4,324,561 A * | 4/1982 | Dean | B30B 11/201 |
| | | | 44/589 |
| 4,502,227 A | 3/1985 | Janusch | |
| 4,601,113 A | 7/1986 | Draper et al. | |
| 4,751,034 A * | 6/1988 | DeLong | B27N 3/00 |
| | | | 162/21 |
| 4,828,573 A | 5/1989 | Jelks | |
| 5,017,319 A | 5/1991 | Shen | |
| 5,071,447 A | 12/1991 | Koppelman | |
| 5,328,562 A * | 7/1994 | Rafferty | B27N 1/00 |
| | | | 127/37 |
| 5,769,908 A | 6/1998 | Koppelman | |
| 6,273,923 B1 | 8/2001 | Tiemeyer | |
| 6,387,221 B1 | 5/2002 | Schoenhard | |
| 6,497,054 B2 | 12/2002 | Davies et al. | |
| 7,241,321 B2 * | 7/2007 | Murcia | 44/589 |
| 7,303,707 B2 | 12/2007 | Rafferty | |
| 7,678,163 B2 | 3/2010 | Brummerstedt Iversen et al. | |
| 7,824,523 B2 | 11/2010 | Maskarinec et al. | |
| 7,842,107 B2 | 11/2010 | Hogsett et al. | |
| 7,901,568 B2 | 3/2011 | O'Connor et al. | |
| 7,931,784 B2 | 4/2011 | Medoff | |
| 2005/0156347 A1 | 7/2005 | Von Haas et al. | |
| 2006/0068475 A1 * | 3/2006 | Foody | 435/105 |
| 2008/0022548 A1 | 1/2008 | Maynard et al. | |
| 2008/0277082 A1 | 11/2008 | Pschorn et al. | |
| 2009/0041639 A1 | 2/2009 | Vanderpool | |
| 2009/0056208 A1 * | 3/2009 | Gauthier | B30B 11/201 |
| | | | 44/636 |
| 2009/0098616 A1 | 4/2009 | Burke et al. | |
| 2009/0120778 A1 | 5/2009 | Vanderpool | |
| 2009/0221814 A1 | 9/2009 | Pschorn et al. | |
| 2010/0005710 A1 | 1/2010 | Shaffer | |
| 2010/0287826 A1 | 11/2010 | Hoffman et al. | |

FOREIGN PATENT DOCUMENTS

| | | | |
|---|---|---|---|
| EP | 1776440 | 1/2006 | |
| EP | 1857532 A1 * | 11/2007 | ............... C10L 5/44 |
| JP | 59-102989 | 6/1984 | |
| NO | 320971 B1 | 2/2006 | |
| WO | 2006/006863 A | 1/2006 | |
| WO | WO 2006006863 A1 * | 1/2006 | ............... C10L 5/363 |
| WO | WO-2006006863 A1 * | 1/2006 | ............... C10L 5/363 |
| WO | 2006/122405 A | 11/2006 | |
| WO | WO 2006122405 A1 * | 11/2006 | ............... C10L 5/363 |
| WO | WO-2006122405 A1 * | 11/2006 | ............... C10L 5/363 |

OTHER PUBLICATIONS

"Environmentally Friendly Technologies for the Pulp and the Paper Industry," edited by A. Young and Massod Adthar, University of Wisconsin, 1998, John Wiley & Sons, Inc.; "Steam Explosion Pulping," p. 191 ff, by Bohuslav Kokta and Aziz Ahmed; © 1998; pp. 192-214.

"Steam Explosion Techniques—Fundamentals and Industrial Applications"; Proceedings of the International Workshop on Steam Explosion Techniques; Milan, Italy; Oct. 20-21, 1988; edited by B. Focher and A. Marzetti; 15 sheets.

Ramos; "The chemistry involved in the steam treatment of lignocellulosic materials"; Nov./Dec. 2003; pp. 1-24; vol. 26, No. 6.

Ramos, et al.; "Steam Pretreatment Conditions for Effective Enzymatic Hydrolysis and Recovery Yields of *Eucalyptus viminalis* Wood Chips"; Holzforschung; 1992; 6 pages; vol. 46, No. 2.

Joon; "High Yield Pulp of Hybrid Poplar Wood by Integrating Steam Explosion Process as a Pre-Stage to Alkali Pulping"; thesis—Faculty of Forestry, University of Toronto; © 2000; 76 pages.

* cited by examiner

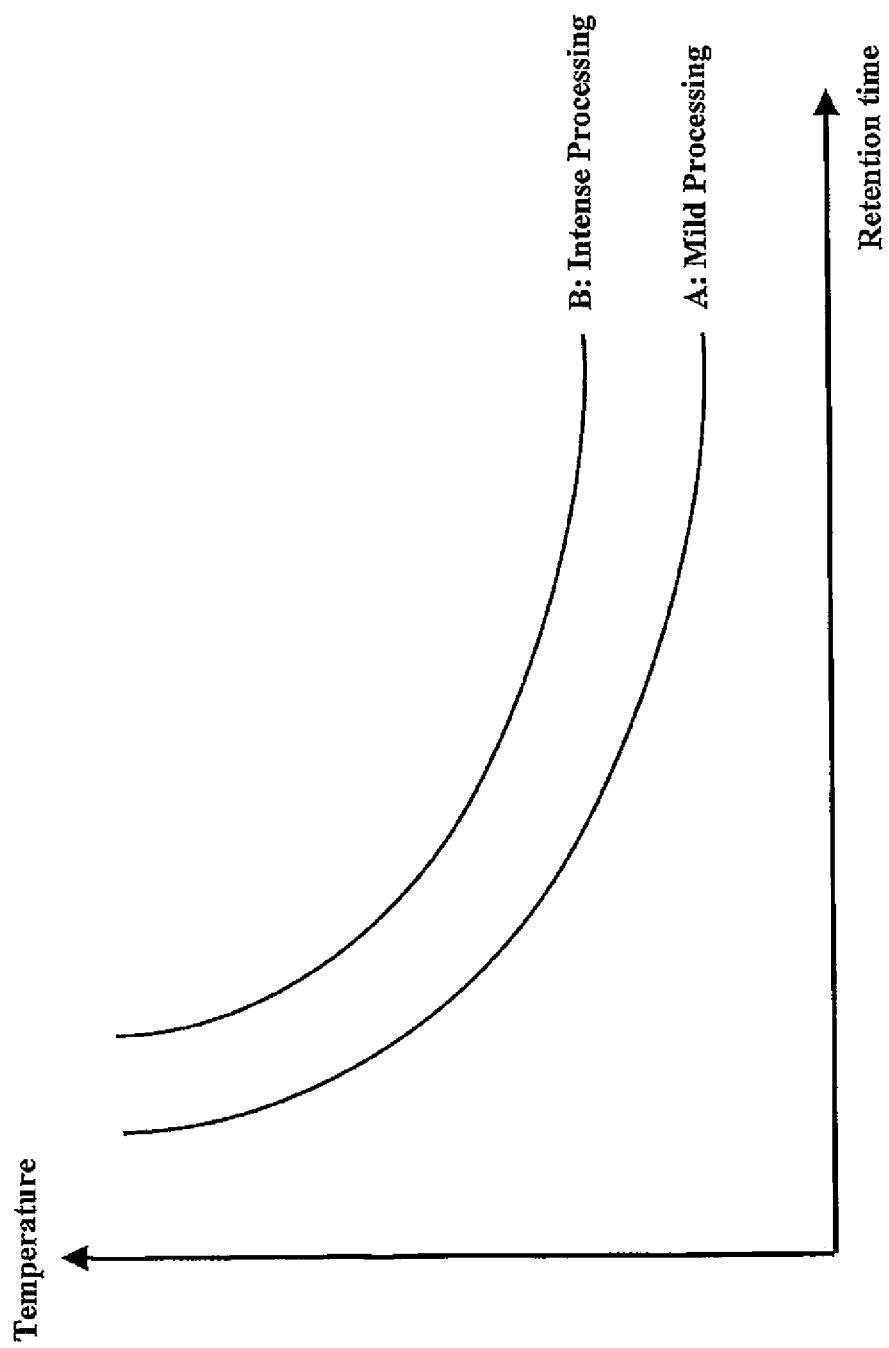

METHOD FOR THE PRODUCTION OF PELLETS OR BRIQUETTES

CROSS-REFERENCE TO RELATED APPLICATIONS

The present application claims priority to and benefit under 35 U.S.C. § 119 and § 365 to International Application PCT/NO2009/000346, filed Oct. 5, 2009; which in turn, claims priority to the Norwegian patent identified by Norwegian Patent No. 327839, filed on Dec. 15, 2008, and Norwegian patent application identified by Serial No. 20092136, filed Jun. 2, 2009, the entire contents of International Application PCT/NO2009/000346 and Norwegian Patent No. 327839 and Norwegian Patent Application No. 20092136 are hereby expressly incorporated herein by reference.

FIELD OF THE INVENTION

The present invention relates to a method for the production of pellets and briquettes, from lignin containing material, such as from raw materials of wood, bamboo, bagasse, straw, or grass.

In recent years there has been a steadily increasing focus on the environment and in particular on the emission of "fossil" $CO_2$. There is therefore a strong commitment internationally to achieving the transition from fossil energy sources (oil, gas, coal and coke) to biological or renewable energy sources in order to reduce the emissions of "fossil" $CO_2$.

Fuel pellets of wood are one of the fastest growing forms of bioenergy. Wood pellets and briquettes have also several other applications, but the most common field of use is as fuel pellets. Today, wood pellets are produced in substantial volumes at a large number of plants, especially in Europe and North America.

Traditionally, the raw materials are primarily sawdust, with a typical particle size of less than 3 mm and a typical relative moisture content of about 50-55% by weight, and raw materials which are residual products from planing mills, furniture factories, etc., with a typical relative moisture content in the range of about 10-18% by weight.

Mechanical Process

The main features of the most common method for producing pellets, which is a mechanical process including fine grinding and compression, are as follows:

Drying

Raw materials with a relative moisture content of more than about 18-20% by weight are dried prior to pelletization. These materials constitute the major portion of the raw materials, which today are mostly sawdust. The drying is usually carried out in drum dryers into which the raw materials are introduced and into which there are injected flue gases from a combustion plant fuelled by chips/bark or the like, direct drying taking place on the basis of flue gases. However, several types of dryers are in use, including low temperature dryers.

Grinding

The next step is mechanical fine grinding of the raw materials, down to a typical particle size of less than about 2 mm. This is usually done in an impact mill (hammer mill).

Pelletization

The material is then passed to pellet presses, where pelletization typically is carried out in that the material is pressed through cylindrical holes in a ring die, and the compressed material that comes out is cut into pellets.

Cooling

The newly produced pellets, which have a high temperature and a soft consistency, are then passed to a cooler, which is a vessel through which air is passed, so that a controlled cooling of the pellets is obtained, and at the same time the volume of fines is reduced. Finished pellets then exit the cooler.

For pellets that are produced in the mechanical process, the volume of fines (dust) is often higher than desirable, especially after transport and handling. Therefore, binding agents have, to a certain degree, previously been added during the pelletization process, often lignosulfonates, by-products from wood processing. However, this gives an undesirable addition of chemicals.

U.S. Pat. No. 4,502,227 and GB 2402398 describe drying and pelletization of wood pellets.

Briquettes are produced from the same raw materials as pellets. While pellets have a typical diameter of about 6.8 or 12 mm and a length of about 10-20 mm, briquettes are larger, with a typical diameter of about 50 mm, and a length from about 20 mm and upwards to about 300 mm. Briquettes are not produces in ring dies, but in separate briquette presses where the raw material is compressed. The briquettes typically have a lower volumetric weight than pellets.

Steam Explosion

From NO 320971/EP 1776440 there is known a method in which the raw materials are first dried to a relative moisture content of 30-45% by weight, then passed to a reactor to which steam is supplied until the material is maintained at 200-300° C. for sufficient time to soften the material, after which a depressurization is carried out in at least two steps so that the material is "steam-exploded". The material is then defibrated and lignin is released. The material subsequently passes to a new drying step, after which the material is optionally pelletized. This method is the production method that is used commercially today.

One of the reasons this technology is still in use is that in the technical field the view is held that there must be "sufficient residual moisture" in the material to enable it to be defibrated in a pressure tank, given as 30-45%, and thus that there is not sufficient moisture for defibration at lower moisture levels. In NO 320971/EP 1776440 it is indicated that even with a relative moisture content of 30-45% according to said invention, as against the conventional 45-65%, there is still sufficient residual moisture for defibration by pressure reduction. It has therefore been assumed in the art that excessively low moisture content, i.e., below 30%, does not provide a steam explosion of sufficient force.

Furthermore, it has been observed that the friction between the material and the escape pipe of the reactor increases at lower moisture levels, and practical experience has shown that during trial runs with materials drier than 30% there were problems emptying the reactors at plants.

Moreover, according to the prior art two drying steps have been used, both one before and one after steam explosion, to ensure that the distribution of moisture in the material as a result of condensation after discharge is sufficiently even for pelletization.

In the temperature ranges used in the methods above, there starts after a short time a certain hydrolysis of the organic material and a loss of dry matter that is undesirable, as the material hydrolyzed, and thus the energy content thereof, disappears or is oxidized either in after-drying or during the heating in the pelletization process. With the prior art methods, this dry matter loss is of several percent.

SUMMARY OF THE INVENTION

The term "lignin containing material" should be understood as any material containing lignin which may be used in the invention, such as lignocellulosic materials, wood comprising materials, for example wood, bamboo, bagasse, straw, or grass. The lignin containing material may be in any suitable and processable form, such as in the form of powder, dust, sawdust, chips, splinters, chippings, shavings, cuttings or similar particles.

According to the invention there is thus provided a method for the production of pellets or briquettes from lignin containing material, characterized by including the steps of:
- (a) passing the material, if it has a relative moisture content of more than about 30%, alternatively more than about 20% by weight, to a drying step and drying it to a relative moisture content of about 0-30%, alternatively about 0-20% by weight;
- (b) passing the material, optionally via an intermediate storage step, to a heat treatment step and heating the material to about 180-235° C. by injecting steam into a reactor;
- (c) maintaining the material in the reactor at the temperature reached for a sufficient time to soften the material and release lignin;
- (d) reducing the pressure in the reactor in at least one step; and
- (e) pelletizing or briquetting the treated material.

Preferred embodiments of the method are set forth herein, wherein one aspect relates to a method wherein the material is chosen from the group comprising: lignocellulosic material, wood comprising material, wood, bamboo, bagasse, straw, or grass. The material may also be chosen from group comprising: dust, saw dust, chips, splinters, coarse particles, chippings, shavings or cuttings.

In another aspect the invention concerns a method in which the steam injected into the reactor is superheated unsaturated steam, which further reduces the moisture of the material during the heat treatment, such as in the range of about 1-5 percent units, about 4-5 percent units and alternatively about 5 percent units of relative moisture of the material. The super heated unsaturated steam is for example injected to the reactor at about 350° C. and about 20 bars.

The treated material may in a step (d2) also be emptied between the steps (d) and (e), from the reactor and received in a receiving tank or cyclone where the steam is separated from the material, so that as little condensate from the steam as possible is brought along as moisture further in the process or product. Further, the treated material may be mixed with additional treated or non-treated lignin containing material, in a step (d3) between step (d) and (e), preferably after the step (d2).

The material may in one embodiment be dried to a relative moisture content of about 5-15% by weight, alternatively about 2-12% by weight before it passes to the reactor step (b). The retention time in the reactor may be within the range of about 10 seconds to 2 hours, about 30 seconds to 60 minutes, about 1-30 minutes, about 1-20 minutes, about 1-15 minutes and alternatively about 1-12 minutes.

In one embodiment the last pressure reduction of the reactor takes place suddenly by steam explosion so that the material is defibrated, while in another embodiment the depressurization of the reactor takes place slowly without steam explosion.

The material may be coarse particles, such as cellulose chips, such as with a length of about 25 mm. The material may also be finely divided before the reactor step, such as in the form of dust or sawdust or more finely divided material, such as with a length of less than about 3 mm.

Possibly, the admixed lignin containing material, has a moisture content of less than about 18% by weight and/or a typical particle size of less than about 2 mm.

In another aspect the invention concerns a method as above, wherein the method includes an additional step of passing the pellets or briquettes to a cooler, through which air is passed for a controlled cooling of the pellets or briquettes, whereby the volume of fines is reduced.

In another aspect, the invention concerns pellets or briquettes which are produced as described herein. The pellets or briquettes may contain a relative moisture content of about 5% by weight or less, or about 2% by weight or less and possibly have an energy content of about 5.0 MWh/tonne or more, or about 5.2 MWh/tonne or more.

Drying

The material that is to be used may be pre-dried, or have a relative moisture content of less than 30%, or less than 20% by weight, and thus not require drying. If the moisture is above 30%, or above 20%, the material is dried as a step in the process itself. The material that is fed into the reactor thus has a substantially lower moisture content than has previously been used in the prior art. The present invention discloses a moisture content after drying of about 0-30%, alternatively about 0-20%, as against 30-45% in the prior art, thereby overcoming some major objections still in existence in the art as explained introductory. The reduced moisture in the material results in lower steam consumption in the reactor, which gives lower production costs. The relative moisture content of the material entering the reactor is preferably in the range of about 5-15% by weight, or about 2-12% by weight.

By drying the material down to a range according to the invention, there will be so little condensation that the problems of unevenness in the moisture distribution in relation to pelletization mentioned above are eliminated. Thus, drying can be carried out in one step (only prior to steam explosion) instead of in two steps as in the prior art (which comprises drying prior to steam explosion and drying before the material passes into the pellet press), which gives substantially lower investment costs than if two drying steps are used as earlier.

In order to reduce the moisture in the final product it is possible to dry the processed material further down after steam explosion, which primarily is current if the moisture content in the reactor is in the upper half of the interval of 0-30% in mass.

Some drying may occur by injecting superheated (unsaturated) steam into the reactor, instead of dry saturated steam, such as for example after step (d) of the method above. This will result in dry material evaporating until the steam has been saturated, and that the moisture in the material after processing in the reactor is lower than if only saturated steam had been injected.

Heat treatment

By limiting the temperature range for the treatment to about 180-235° C., as compared to the known ranges of 200-300° C., undesirable reactions in the material that occur above 235° C. are also avoided, while remaining within operationally optimal temperatures in relation to energy consumption and especially production of steam.

The retention time in the reactor is advantageously about 1-12 minutes.

Pressure Reduction

The reduction of pressure in the reactor takes place either:
(1) in that the last pressure reduction takes place suddenly, thereby obtaining a steam explosion in which the material is defibrated and lignin is released; or
(2) by a gradual reduction of pressure where this reduction per se does not result in defibration of the material, but wherein lignin is nonetheless released because the material has been heated for a sufficient length of time at a temperature range as mentioned above, about 180-235° C.

Method (2) is appropriate when the material is relatively finely divided prior to treatment in the reactor (as e.g., sawdust with a typical length of less than 3 mm, or even more finely divided material), whereas method (1) is preferable when there are coarser particles (as e.g., cellulose chips, with a typical length of about 25 mm). This is due to the fact that with method (1), there is no need for mechanical fine grinding after the treatment in a reactor even though the raw materials are of the size of cellulose chips. However, if method (2) is used, the raw materials should be more finely divided than cellulose chips if the material is to be able to pass directly to pelletization without any further mechanical grinding.

Although the defibration that takes place in method (2) is less substantial than in the prior art, by using a material with lower residual moisture content, it is still sufficient for pelletization.

If the material is sufficiently finely divided beforehand, a sufficiently good result is obtained with method (1) by carrying out such a gradual pressure reduction in the reactor that there is no steam explosion, only a heat treatment of the material with steam in the reactor.

Defibration by steam explosion is just one of the parameters that are of primary importance in rendering the material suitable for pelletization. Tests show that an increase in temperature and in particular in retention time not only makes it easier to defibrate material by steam explosion, but also makes the material softer and gives more released lignin even without steam explosion, which thus renders the material more suitable for pelletization.

The design of the reactor and equipment associated therewith permits discharge when the material has low moisture content. It is quite possible to equip the reactor so that it can be emptied even without a sudden reduction in pressure (steam explosion) in the last step.

Pelletization—Briquetting

Lastly, the treated material is pelletized, optionally after it has been mixed with other lignin containing material, for example, non-steam exploded lignin containing material. The admixed lignin containing material advantageously has a moisture content no higher than 18% by weight and a typical particle size no greater than 2 mm. Alternatively, the treated material may be briquetted instead of pelletized in a briquette press.

By using the present invention, the early and major reduction in moisture results in the heat-induced hydrolysis of the organic material starting later and being weaker than in the known methods. Thus, the present invention reduces the loss of dry matter that is a problem in the prior art.

Today, normal moisture in pellets is about 8-10%, and in practice there are no pellets with moisture content below 5%. This is due to the fact that for pelletization without the lignin in the material being released, a certain moisture content is essentially required. By means of the present invention, pellets or briquettes can be obtained with a moisture content of 2% and lower which have the same good binding properties as other known pellets prepared from steam-exploded wood.

Today's pellets with a moisture content of 8% have an energy content of 4.8 MWh/tonne while pellets or briquettes obtained in the present invention with a 2% moisture content have an energy content of 5.2 MWh/tonne, and at 5% moisture, the energy content is 5.0 MWh/tonne. This is a major advantage in connection with transport and storage, and also that higher output can be obtained in combustion plants as a result of a higher concentration of energy in the combustion chamber.

The invention also results in a number of advantages compared with mechanical production of wood pellets and briquettes. The advantages over the mechanical process for the production of pellets reside in higher quality and higher capacity. Higher quality consists in the treated pulp having binding properties which far exceed the previously obtained pulps and the improved binding properties of the pellets lead to a lower volume of fines (dust), and a better cohesion. Higher capacity of the pellet presses or briquette press, with the same electricity consumption, is obtained because the pulp in the present invention has a softer consistency and is easier to pelletize than mechanically finely ground wood, and the bulk weight of the pellets or briquettes can also be increased without increasing the consumption of electricity.

A further advantage compared with pellets and briquettes produced by mechanical production is that pellets prepared according to the invention are virtually non-hygroscopic. Mechanically produced pellets and briquettes absorb moisture so easily that they must be stored and handled in dry conditions. If they come into contact with water, they will lose their form and revert to a form of wood powder or sawdust. The pellets and briquettes according to the invention, on the other hand, can be handled and stored without contact with water or moisture being a problem; they retain their shape and only absorb water to a slight degree, and only after a long time. This means in practical terms, inter alia, that where wood pellets and/or briquettes are used as a supplementary fuel in a coal combustion plant, with pellets and briquettes of the present invention it is possible to use the same storage and transport facilities those already present for coal. With mechanically produced pellets, on the other hand, separate facilities must be provided to ensure dry handling during storage and transport. For the pellet plants, the present invention also means that the storage facilities can be made far more cheaply than today.

The present invention thus provides an improved method that obtains an improved product as disclosed above. The method provided according to the invention can be accommodated to existing pellet or briquette plants which today use neither steam explosion nor elevated temperature treatment with steam for pelletization.

BRIEF DESCRIPTION OF THE DRAWING

FIG. 1 shows a graph where temperature is plotted against time for two separate processing courses.

DETAILED DESCRIPTION OF THE INVENTION

A description of example embodiments follow below, which are not meant to limit the scope of the invention.

EXAMPLES OF EMBODIMENTS

The raw materials may be any kind of lignin containing material. Raw materials that have not been dried artificially or naturally normally have a relative moisture content of about 45-55% by weight, while naturally dried raw materials have a typical relative moisture content of about 15-35% by weight, or even about 28-35% by weight.

An advantageous method according to the invention includes the following steps:
 (a) Raw materials with a relative moisture content of more than about 30%, alternatively more than about 20% by weight are dried to a relative moisture content of about 0-30%, alternatively about 0-20% by weight. This is done typically as direct drying in a drum dryer into which flue gases are injected, but other drying methods may also be used.
 (b) The raw materials are then passed from the drying step directly, or optionally after intermediate storage, to a reactor in which the raw materials are heat-treated, optionally steam-exploded. This takes place in that after the raw materials have been introduced into the reactor, the filling valve for chips is closed, and steam is injected into the reactor until the temperature has reached about 180-235° C., and at a pressure of for example about 20 bar.

Normally, saturated aqueous steam is used in the drying step at a temperature in the range given above. However, in the present invention, it has been found that if the steam supplied to the reactor is superheated (unsaturated) steam, the moisture of the material may be further reduced during the heat treatment itself.

(c) This temperature is subsequently maintained for about 1-12 minutes.
 (d) A pressure reduction is then carried out in one or more steps. In the last pressure reduction, the pressure is reduced to atmospheric pressure, and the treated material is discharged from the reactor.

The material has then been transformed into a pulp, in the case of wood as raw materials into a brown-coloured "wood pulp", with a substantially softer consistency than the ingoing raw material. If the last pressure reduction takes place as a sudden drop in pressure, this is a steam explosion in the traditional sense. If the last pressure reduction takes place gradually and cautiously, there is no steam explosion that defibrates the material, but the material is nevertheless given a softer consistency and a characteristic brown colour. The brown colour is due to the fact that the lignin has been softened and partly released through retention in the temperature range mentioned above.

(d2) Possibly, the pulp that is discharged from the reactor may be received in a receiving tank or cyclone where the steam is separated from the pulp, so that minimum condensate from the steam remains as moisture further in the process or product.
 (d3) The material is then optionally mixed with dried raw materials that have been ground down in an impact mill to a particle size suitable for pelletization. The optionally admixed lignin containing material advantageously has a moisture content that is no higher than 18% by weight and a typical particle size no larger than 2 mm. This mixed pulp or optionally unmixed material is then passed to pelletization or briquetting.
 (e) The material (the mixed mass or possibly the unmixed material) is subsequently passed to pellet and/or briquetting presses, where the pelletization typically takes place in that the material is pressed through cylindrical holes in a ring die and the compressed material that comes out is cut into pellets, or the material is alternatively pressed into briquettes in a briquetting press.
 (f) The newly produced pellets or briquettes, which have a high temperature and a soft consistency, are then preferably passed to a cooler, which is a vessel through which air is passed, so that a controlled cooling of the pellets is obtained, and at the same time the volume of the fines is reduced. Finished pellets/briquettes then exit the cooler.

In the present invention, the process in the reactor can be optimized in a number of ways. The basic relations are that:
 If the temperature of the reactor is increased, the retention time can be reduced; if the temperature is lowered, the retention time must be increased. By increasing the temperature, capacity can be increased through a shorter retention time.
 The lower the ingoing moisture, the lower the steam consumption, and the lower the energy consumption and the shorter the filling time for steam, thus the higher the production capacity.
 If particle size is increased, the temperature and/or the retention time must be increased.

The optimum treatment conditions are different for different types of lignin containing material, even for different types of wood. There are also local variations (inter alia, on the basis of growth conditions) within the individual material types, which means that the optimization of the process conditions give best results when done for the individual plant.

Referring to FIG. 1, the principles of the relation or dependency between processing parameters are illustrated for two different ways of processing a certain material, in this case temperature and retention time at a certain pressure. Curve A "Light processing" illustrates the temperature and time relation for processing a certain material in a "mild" manner. For all the combination of temperatures and retention times on Curve A, the degree of processing will be about the same, i.e. a mild processing, which may be optimal in some markets, such as for pellet ovens. Correspondingly, Curve B "Intense processing" represents parameters that provide a more vigorous treatment which for a given retention time always is treated at a higher temperature compared to a "mild processing", and which may be optimal for other markets, such as bulk supplies which involves more severe handling. Pellets/briquettes treated in a "severe processing" have a higher bulk weight than pellets/briquettes treated by a "light processing".

If the particle size of the raw material is increased, the curves will move outward in the diagram, i.e., away from origo, in order to provide the same degree of processing.

For different types of raw materials, the change in retention time and temperature will generally follow the same type of shape or course of the curves. However, the displacement will be different for each type of material, and sub type of material, such as for different types of wood. The curve will have the same structure, but a different position and somewhat different course in the diagram. For example, there are important differences in the curves for soft and hard wood, and even a certain difference between spruce/fir and pine. The curve for pine will for example be further away from origo than the curve for spruce/fir for the same degree of processing.

Hence the processing parameter of a retention time of about 1-12 minutes is only a preferred interval, based on desired processing time in a plant and the degree of processing, in relation to a practical temperature and pressure ranges. In most cases, it will be preferable to remain within these ranges, but in some cases other conditions outside of these ranges may be preferable. Such ranges may for example be within about 10 seconds to 2 hours, or about 30 seconds to 60 minutes, about 1-30 minutes, about 1-20 minutes or about 1-15 minutes and any ranges in between. For example, a small producer may prefer to work at the lowest possible pressure and temperature ranges for steam, so that less costly steam equipment may be used, and security and competence for operators are less strict, although for most producers, higher temperatures would be more profitable. The longer retention time needed for working at low temperature/pressure reduces the production capacity. Still, this may be preferable for example if supply of steam is limited. Also, longer retention time at low temperatures, such as at about 180° C. may also be used for a certain time only, such as during start-up or ending of the process run, as processing starts at about 180° C. and continues as long as the temperature is kept above 180° C.

The advantages over a mechanical process for production of pellets and briquettes reside in higher quality and higher capacity. Higher quality consists in the steam-exploded/heat-treated pulp having natural binding properties that far exceed the binding properties the wood has when it is compressed mechanically without any preceding steam explosion. This is due to the fact that cellulose, hemicellulose and lignin are to some extent released. The binding properties are obtained when pelletizing steam-exploded pulp without any addition of non-steam exploded pulp. The increase in binding properties for pellets produced from a mixture of mechanically finely ground lignin containing material, such as wood, and damp-exploded/heat-treated pulp of the present invention compared with pellets/briquettes produced from purely mechanically finely ground wood is, however, so great that it gives a sufficient increase in quality in relation to large parts of the pellets/briquette market. The improved binding properties lead to a lower volume of fines, and better cohesion which is one quality criteria for pellets. Higher capacity in the pellet and briquette presses, with the same electricity consumption, is obtained because steam-exploded pulp has a softer consistency and can more readily be pelletized than mechanically finely ground wood, and it is also possible to increase the bulk weight of the pellets and briquettes without increasing the consumption of electricity.

The optimal mixture ratio of steam-exploded/heat treated pulp to other lignin containing materials, such as wood, in pellets/briquettes depends upon a number of factors, which are often different for each individual plant. The type of lignin containing material, such as wood, used is a major factor, as is the availability of raw materials at the plant in general. The relation between electricity costs and the thermal energy used in the reactor process is also important because the portion that is mixed with the steam-exploded pulp is finely ground in an impact mill in advance, which requires electrical energy. It is also of major importance which market the products, pellets or briquettes are destined for, as the relative importance of the increase in quality may be different. For some markets, it will be optimal that nothing is admixed, i.e., that only steam-exploded pulp and/or only heat-treated pulp is used, while for other markets an admixture of about 20-25% may be optimal. In other cases, only about 10-20% by weight of steam-exploded/heat-treated pulp and about 80-90% by weight of non-steam exploded lignin containing material, such as wood, may be used.

The consistency of the steam-exploded/heat-treated pulp also has an effect on the quality of the pellets/briquettes, and thus on what mixture ratios are optimal. The particle size for the raw materials/the material upon entering the reactor is decisive for whether the pulp becomes a brown powder, as when ingoing raw material is sawdust, or whether the pulp has a consistency more like dry shredded peat, with longer fibre bundles that are soft. Pellets/briquettes from the last type of pulp provide even better properties as regards a smaller quantity of fines than steam-exploded pulp from sawdust. To make this type of pulp, the ingoing raw material in the reactor must be far larger than the typical particle size for sawdust, and some types of lignin containing materials are better suited than others for producing such pulp.

In the present method, the moisture in the raw materials when they enter the reactor to be steam-exploded/heat-treated is considerably lower (about 0-30%, alternatively about 0-20% by weight) than in the prior art method (30-45% by weight). This means that the steam consumption in the reactor that is necessary to heat the material to the given temperature is lower, which results in lower production costs. Lower steam requirements also give a shorter filling time and pressure reduction time for steam, which in turn gives a greater number of portions or batches per time unit. This means higher production capacity in a reactor of a given size.

In the present invention there is preferably just one optional drying step, independent of the initial moisture and the pulp does not need to be dried before it passes to pelletization. However, the mass may possibly be dried according to the present invention by using superheated (unsaturated) steam in the reactor during the heat treatment, instead of saturated steam which is common for such heat treatment.

By using unsaturated overheated steam in the reactor during heat treatment, water will be drawn out of the material and the temperature of the atmosphere in the reactor is reduced to obtain equilibrium conditions. In this manner, superheated steam may be supplied at conditions and amounts that result in the same temperature range (about 180-235° C.) in the reactor for the heat treatment that is necessary for the processing as described earlier. Such conditions may for example be unsaturated aqueous steam of about 350° C., at about 20 bars. In real life, a reduction in moisture in the raw material is in this way obtained of typically up to 5 percent units. That is to say that material loaded into the reactor with relative moisture of about 20% might be reduced to about 15%, and likewise that if material with relative moisture of about 12% is fed to the reactor the moisture of this material might be reduced down to about 7%, by injecting superheated steam into the reactor.

Hence, the present invention makes it possible to obtain extremely dry material for pelleting or briquetting, and thereby extremely dry pellets or briquettes. Alternatively, the technique of superheated steam for reduction of water of the material in the reactor is used to reduce the temperature or the time of the drying step before the heat treatment in order to obtain the same product with the same properties as described earlier. Depending on whether more, less or the same amount of energy is supplied with the overheated steam, different results and products may be obtained.

It is also possible to dry the material more in the reactors, but then the reactors need to be used as driers in addition to the heat treatment, which would extent the retention time in the reactors, and thereby reduce the capacity for processing.

The advantage of only performing one drying step, and possibly obtaining further reduction of water content in the material by superheated steam in the reactor, is that two classic drying steps as in prior art are avoided, wherein saturated steam and two dryers is used, which means important higher investment costs than if one drying step is used as in the present invention. When the same drying capacity is to be divided on two classic driers, the investment costs are moreover substantially higher than for one dryer which has the collected capacity alone. According to the present invention the capacity of the one dryer may possibly also be reduced if additional drying is performed in the reactor as mentioned above, or the total treatment time may be reduced.

In the present invention, the pressure reduction may alternatively be carried out so that a steam explosion is obtained, or the pressure reduction can be carried out so gradually that there is no steam explosion. The choice between these methods is made on the basis of whether the material is so finely divided beforehand that it is not necessary to defibrate it by steam explosion.

The method that is provided according to the present invention can be accommodated to existing pellet/briquette plants that are based on mechanical fine grinding and pelletization or briquetting without other investments than in reactor(s), steam production, receiving the pulp and handling the steam that is separated from the pulp, and optional mixing with mechanically finely ground lignin containing material, for example wood. If the whole feedstock is to be steam-exploded, a reactor can be put in the production line instead of fine grinding (typically with an impact mill). If a mixture is to be made, some of the raw materials may optionally be moved after the dryer to a reactor and some to mechanical fine grinding,—typically in that larger particles are taken to the reactor.

If the two-step drying method from the prior art is to be accommodated to existing plants, an additional dryer must be invested in for drying of the pulp after steam explosion, i.e., before the pulp is pelletized or briquetted. In practice, the same dryer could not be used for raw materials that are to be steam-exploded and the portion of the raw materials that is optionally to be finely ground mechanically, since the requirement of relative moisture content after the drying is very different in the two cases. As such, the method according to the invention is preferable to implement practically, logistically and economically in existing plants.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. A method for the production of pellets or briquettes from a lignin containing material, comprising the steps of:
   passing the lignin containing material having a moisture content of 0-20% by weight into a reactor;
   heating the lignin containing material to 180-235° C. by injecting steam into the reactor;
   maintaining the material in the reactor at the temperature reached for 1-12 minutes to soften the material and release lignin;
   reducing the pressure in the reactor in at least one step, wherein the pressure reduction in the reactor causes steam explosion defibration of the material; and
   forming substantially all components of the treated material to form pellets or briquettes.

2. The method of claim 1, wherein the lignin containing material is lignocellulosic material, wood comprising material, wood, bamboo, bagasse, straw, or grass.

3. The method of claim 1, wherein the lignin containing material is in the form of dust, saw dust, chips, splinters, coarse particles, chippings, shavings, or cuttings.

4. The method of claim 3, wherein the coarse particles are cellulose chips.

5. The method of claim 4, wherein the chips have a length of about 25 mm.

6. The method of claim 1, wherein the lignin containing material is divided before passing into the reactor.

7. The method of claim 6, wherein the length of the lignin containing material is less than about 3 mm.

8. The method of claim 1, wherein the moisture content of the lignin containing material is reduced in the range of about 1-5% units of relative moisture of the lignin containing material.

9. The method of claim 1, wherein the steam is injected into the reactor is superheated at about 350° C. and about 20 bar.

10. The method of claim 1, further comprising the step of:
    passing the material, it has a moisture content of more than 20% by weight, to a drying step and drying it to a relative moisture content of 0-20% by weight prior to passing the lignin containing material to a heat treatment process.

11. The method of claim 1, wherein the material is dried to a relative moisture content of 5-15% by weight before it passes to the reactor.

12. The method of claim 1, further comprising the step of:
    mixing the treated material with a lignin containing material.

13. The method of claim 12, wherein the admixed lignin containing material has a moisture content of less than 18% by weight.

14. The method of claim 12, wherein the admixed lignin containing material has a typical particle size of less than 2 mm.

15. The method of claim 1, further comprising the step of:
    passing the pellets or briquettes to a cooler through which air is passed for a controlled cooling of the pellets or briquettes whereby the volume of fines is reduced.

16. The method of claim 1, wherein the pellets or briquettes have a relative moisture content less than about 5% by weight.

17. A method for the production of pellets or briquettes from a lignin containing material, comprising the steps of:
    passing the lignin containing material having a relative moisture content 0-30% by weight into a reactor;
    heating the lignin containing material to 180-235° C. by injecting steam into the reactor to pressurize the reactor;
    maintaining the material in the reactor for 1-12 minutes to release lignin;
    reducing the pressure in the reactor, wherein the step of reducing the pressure in the reactor causes steam explosion defibration of the material and removing the material from the reactor to atmospheric pressure; and pressing substantially all the treated material to form pellets or briquettes in a press without drying of the material after removing the material from the reactor.

18. The method of claim 17, wherein the lignin containing material is lignocellulosic material, wood comprising material, wood, bamboo, bagasse, straw, or grass.

19. The method of claim 17, wherein the lignin containing material is in the form of dust, chips, splinters, coarse particles, chippings, shavings, or cuttings.

20. The method of claim 19, wherein the coarse particles are cellulose chips.

21. The method of claim 17, wherein the lignin containing material is divided before passing into the reactor.

22. The method of claim 21, wherein the length of the lignin containing material is less than about 3 mm.

23. The method of claim 17, wherein the steam injected into the reactor is superheated unsaturated.

24. The method of claim 17, wherein the lignin containing material treated within the reactor is transferred from said reactor into a receiving tank for separating the steam from the material, so that minimum condensate from the steam remains as moisture in the method, pellets, and briquettes.

25. The method of claim 17, further comprising the step of:
drying the lignin containing material prior to heating the lignin containing material.

26. The method of claim 17, wherein the material is dried to a relative moisture content of 5-15% by weight.

27. The method of claim 17, wherein the pellets or briquettes have a relative moisture content less than 5% by weight.

28. The method of claim 17, wherein the pellets or briquettes have an energy content of greater than 5.0 MWh/tonne.

* * * * *